United States Patent [19]

Kim

[11] Patent Number: 5,473,585
[45] Date of Patent: Dec. 5, 1995

[54] COMPACT DISK PLAYER HAVING SINGLE PICK-UP FOR SELECTIVELY READING DATA FROM EITHER ONE OF TWO PARTIALLY OVERLAPPED PARALLEL DISKS

[75] Inventor: Kwang S. Kim, Anyang, Rep. of Korea

[73] Assignee: Samsung Electronics Co., Ltd., Suwon, Rep. of Korea

[21] Appl. No.: 124,423

[22] Filed: Sep. 21, 1993

Related U.S. Application Data

[63] Continuation of Ser. No. 636,130, Dec. 31, 1990, abandoned.

[30] Foreign Application Priority Data

Dec. 30, 1989 [KR] Rep. of Korea ............... P89-20590

[51] Int. Cl.$^6$ .......................... G11B 17/22; G11B 15/20
[52] U.S. Cl. .................. 369/36; 369/34; 369/197; 369/222
[58] Field of Search ................. 369/34, 35, 36, 369/37, 222, 197, 265; 360/98.01, 98.02, 98.06, 98.07, 98.08

[56] References Cited

U.S. PATENT DOCUMENTS

| | | | |
|---|---|---|---|
| 1,299,853 | 4/1919 | Mott | 369/265 |
| 1,488,185 | 3/1924 | Yeager et al. | 369/197 |
| 1,727,263 | 9/1929 | Yeager et al. | 369/197 |
| 4,403,316 | 9/1983 | van de Veerdonk | 369/222 |
| 4,670,866 | 6/1987 | Hasegawa et al. | 369/37 |
| 4,722,078 | 1/1988 | Nakanishi et al. | 369/34 |
| 4,730,291 | 3/1988 | Ikedo et al. | 369/36 |
| 4,755,978 | 7/1988 | Takizawa et al. | 369/37 |
| 4,773,057 | 9/1988 | Otsuka et al. | 369/197 |
| 4,794,586 | 12/1988 | Korth | 369/222 |
| 4,796,251 | 1/1989 | Hirano | 369/265 |
| 5,025,338 | 6/1991 | Sone et al. | 360/98.06 |
| 5,038,331 | 8/1991 | Ogawa | 369/36 |
| 5,117,413 | 5/1992 | Van Rosmalen et al. | 369/222 |

FOREIGN PATENT DOCUMENTS 61-162875  7/1986  Japan .

Primary Examiner—John H. Wolff
Assistant Examiner—David L. Ometz
Attorney, Agent, or Firm—Cushman Darby & Cushman

[57] ABSTRACT

An improved compact disk player device is provided which has compact dimensions and results in reduced cost of manufacturing. The compact disk player device achieves the above described advantages by providing a unique construction whereby multiple compact disks can be loaded onto a retractable tray along parallel, spaced apart planes. In doing so, compact disks to be loaded onto the receiving tray are positioned so as to overlie one another. An angularly rotatable pick-up is provided which reads disk data from a selected one of the compact disks and which rides along a tilted guide which compensates for differences in height between respectively selected disks. The overlying disk construction results in a compact design which will ultimately reduce cost of manufacture. Clamping elements are also used to stabilize, control and protect a rotating disk during a read operation. Thus, the use of slidable guides to clamp down an inserted disk is based on simple to make features, reducing complexity and ultimately cost of manufacture.

4 Claims, 2 Drawing Sheets

COMPACT DISK PLAYER HAVING SINGLE PICK-UP FOR SELECTIVELY READING DATA FROM EITHER ONE OF TWO PARTIALLY OVERLAPPED PARALLEL DISKS

This is a continuation of application Ser. No. 07/636,130, filed on Dec. 31, 1990 now abandoned.

BACKGROUND OF THE INVENTION

1. Field of the Invention

This invention relates to an angular-type compact disk player wherein, more particularly, the space in which two sheets of disks are loaded simultaneously can be decreased, and the dimensional size of the product can be decreased.

2. Description of the Prior Art

Generally, in the type of compact disk players designed to load two sheets of disks simultaneously for playing, there is provided a disk receiving space having disk setting parts for setting the two sheets of disks individually on a plane; at both upper and lower sides of which, chuck plates for holding the disks, and turn tables, are arranged respectively. Further, a pick-up driving device for reproducing signals from the disks is disposed at predetermined positions of both sides of the disk receiving part.

Thus, in operation, the disk selected by the user is clamped, and the pick-up driving part located at the side corresponding to the selected disk is operated to reproduce the signals from the disk.

Such a conventional compact disk player has a disadvantage that the over-all dimensions are longer than necessary and cost becomes a problem because various parts for driving two sheets of disks are disposed respectively and a wider receiving space for those parts should be previously reserved.

SUMMARY OF THE INVENTION

It is an object of the present invention to provide a compact disk player capable of reproducing one of two sheets of disks selectively by use of one pick-up driving part, while minimizing the space for loading the disks in such a manner that the disks are loaded therein in partially juxtaposed relationship, with the disks not being in contact with one another.

In order to accomplish the above object, there is provided a compact disk player for loading a plurality of disks simultaneously and reproducing one of the plurality of disks selectively comprising, first and second disk receiving parts for setting the disks, each being formed in both sides on a tray which is retractably and projectably driven within a main body, pick-up driving means for reproducing selectively the one of the plurality of disks which are set on the first and second receiving part, said means being disused on a damping part of the bottom of a chassis, and clamp fixing members operatively connected on both sides of the chassis of the main body for holding a disk by means of a clamp.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

The present invention will be particularly described as follows, in response to one preferred embodiment with reference to the accompanying drawings.

Figure 1:
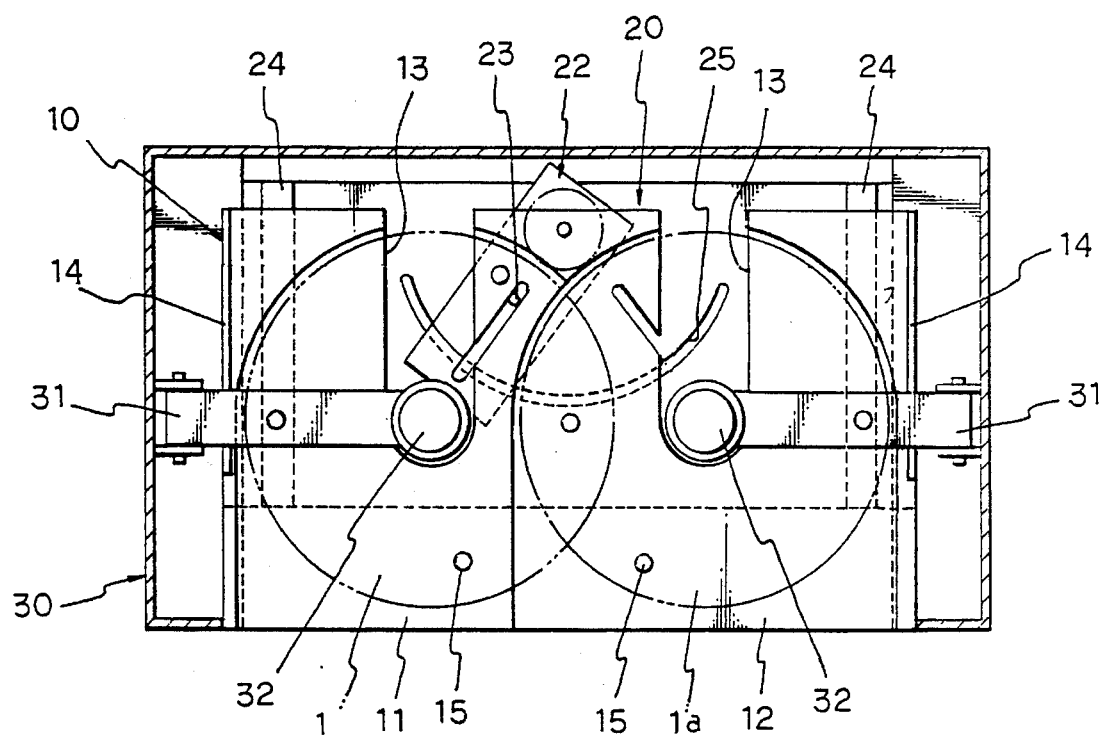
FIG. 1 is a schematic plan view of a compact disk player according to the present invention.
Figure 2:
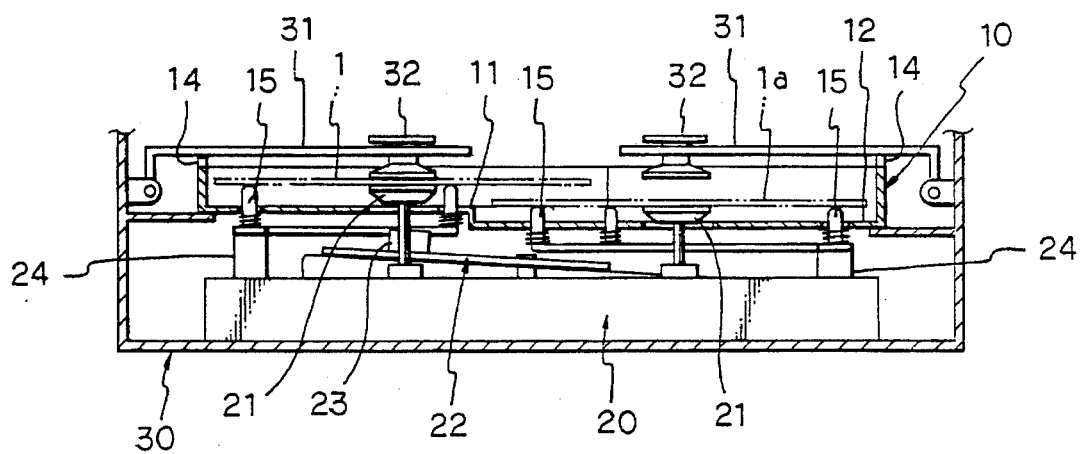
FIG. 2 is a schematic view in vertical cross-section of the compact disk player.

As shown in FIGS. 1 and 2, a tray 10, on which two disk receiving parts 11 and 12 are provided, is retractably and projectably arranged in order to load two sheets of disks 1 and 1a therein to reproduce the disks selectively. At the lower side of the tray 10, a damping part 20 for damping the vibration is also provided, on which turntables 21 and pick-up driving part 22 for holding and reproducing the disks 1 and 1a set on the disk receiving parts 11 and 12 at both sides thereof are disposed.

The two disk receiving parts 11 and 12 provided on the tray 10 are formed to be vertically stepped, so that the two sheets of disks 1 and 1a are loaded therein in partially juxtaposed relationship, with the disks not being in contact. Cutout portions 13 are provided at the intermediate portion between the two disk receiving parts 11 and 12 for free retraction and projection of the tray 10.

Figure 3:
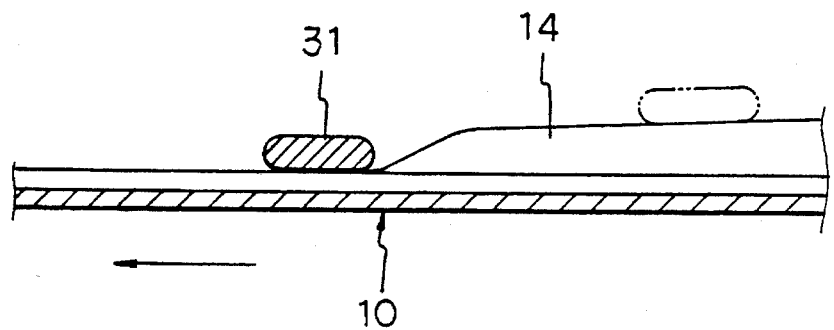
FIG. 3 is a view in vertical cross-section of the essential parts, showing the lifting-up and lowering states of a chip fixing member in the compact disk player.

Moreover, tilted guides 14 are formed on the upper faces at both sides of the tray 10, as shown in FIGS. 2 and 3. The tilted guides 14 enable the ends of the tray to be hinged to the inner walls at both sides of a chassis 30 when the tray 10 is taken-off. Fixing members 31 which are provided with clamps 32 are respectively mounted on the front ends of the tray 10 to be lifted up and be lowered.

Figure 4:
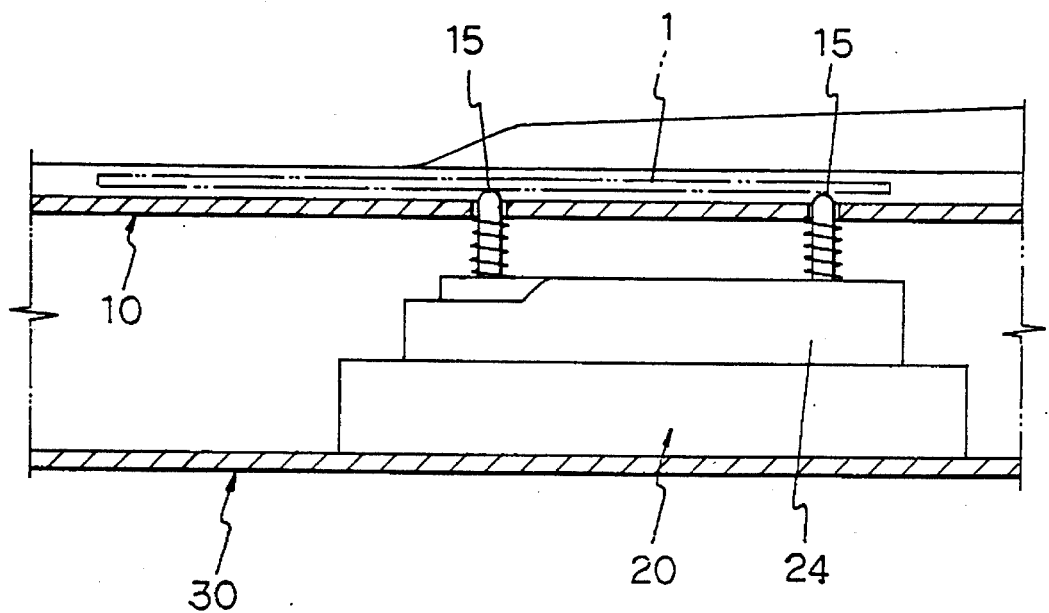
FIG. 4 is a view in vertical cross-section of the essential parts, showing the lifting-up and lowering states of a disk supporting member in the compact disk player.

In addition, as shown in FIGS. 2 and 4, tilted guides 24 are formed at both sides of a damping part 20, so that disk supporting members 15 are lifted-up therethrough when the tray 10 is taken-off, each member 15 being resiliently disposed through and below the bottom of the receiving parts 11 and 12 respectively.

Both turntables 21 on the damping part 20 are protrudedly arranged toward the intermediate cutout portion 13 of both receiving parts 11 and 12 and are vertically spaced apart from each other with a difference in height as much as that between receiving parts 11 and 12.

As shown in FIG. 1, at the intermediate portion of the rear side of the damping part 20, a pick-up driving part 22 is operatively connected to rotate along an arc-shaped tilted guide 25 formed on the upper face of the damping part 20, and to compensate the difference in height between the receiving parts 11 and 12. A pick-up 23 is provided to the pick-up driving part 22, and is linearly moved by a pick-up driving motor (not shown) at the lower side.

Now, the operation of the compact disk player with the above-described construction according to the present invention will be described hereinafter.

First, the description is a process which the tray 10 is taken-off with each disk 1 and 1a being laid on both receiving parts 11 and 12 of tray 10 respectively.

FIGS. 1 and 2 show the state where tray 10 is retracted into the chassis 30 of the compact disk player, with the disks 1 and 1a being set within the receiving parts 11 and 12 respectively. FIG. 2 shows the state where disk 1 is first laid on the lower receiving part of the tray 10, of which width is largely narrowed due to the overlapping of the right and left receiving parts 11 and 12 while both parts are vertically stepped (in this invention the right receiving part 12 is the lower one). Namely, the disk 1 is laid on the right receiving part 12, and then the disk 1a is set on the left receiving part 11.

Clamps 32 are lowered to hold the disks 1 and 1a between the turntables 21, with the bottom of the clamp fixing member 31 being positioned at the lower portion in the path of the tilted guide 14 at both sides of the tray 10 as shown in FIGS. 3 and 4.

The forward end portion of the disk supporting member 15 does not contact the bottom of the disk. The bottom of the disk supporting member 15 contacts the lower portion in the path of the tilted guide 24 on the upper face of the damping part 20 as described above.

Thus, when the signals of the disk 1 in the left receiving part 11 is reproduced, the pick-up 23 of the pick-up driving part 22 is positioned at the lower side of the left receiving part 11. In this position, the signals of the disk can be reproduced by the rotation of the turntable 21 located at left-side and the linear movement of the pick-up 23 of the pick-up driving part 22.

When the signals from the disk 1a in the right receiving part 12 are reproduced, the rotation of the pick-up driving part 22 driven by the motor (not shown) makes the pick-up driving part 22 rotate toward the right receiving part 12. But the pick-up driving part 22 is guided to the lower face at the right side of the tilted guide 25 and is to be rotated toward the right side because the arc-shaped tilted guide 25 on the upper face of the damping part 20 contacts the bottom of the pick-up driving part 22.

As described above, the arrival of the pick-up driving part 22 at a predetermined position makes the motor for driving the pick-up driving part 22 stop by a sensor (not shown) which is disposed at a predetermined position and thus the part 22 stops. Then, the turntable 21 of the right receiving part 12 is rotated and the pick-up 23 reproduces the signals of the disk 1a.

In this manner, upon the completion of the reproduction of the disks 1 and 1a on the right and left receiving parts 11 and 12, the replacement to with new disks needs to operate a separate motor (not shown) for taking-off the tray 10 in order to take-off the tray 10 forwardly. Then, in response to the forward movement of the tray 10, the fixing member 31 provided with the clamp 32, as shown in FIG. 3 is lifted-up by the tilted guide 14 on the upper face of both sides of the tray 10. Finally the disks 1 and 1a are unheld between the member 31 and turntables 21 and set to be free.

At the same time, in the same manner, the disk supporting member 15 disposed on the bottom of the tray 10 is also protruded toward the upper side of the right and left receiving parts 11 and 12 by the tilted guide 24 on the upper face at both sides of the damping part 20, and lifts-up the periphery of the disks 1 and 1a. Then, the bottom of the disk and the upper face of the turntable 21 are spaced apart in a predetermined distance.

With this, because the tray 10 is taken-off forwardly, with the bottom of the disks and the upper face of the turntable 21 being spaced apart, there is no damage when switching disks.

The user removes both disks 1 and 1a on the tray 10 taken-off with this manner, and may set new disks on the right and left receiving parts 11 and 12. The operation for reproducing the new disks can be performed in the same manner as described above.

As described heretofore, according to this invention, the over-all dimensions can be largely decreased and the products can be made at lower cost because the right and left disk receiving parts are formed to be vertically stepped so that the disks are loaded therein, in such a manner that they are partially juxtaposed without contacting one another.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A compact disk player comprising:

a main chassis including independent first and second compact disk turntable assemblies disposed therein for selectively spinning corresponding first and second compact disks, said first and second compact disk turntable assemblies having first and second spin axes which are parallel to one another and spaced apart in a direction perpendicular to said first and second spin axes;

a loading tray for loading the first and second compact disks, said loading tray being extendable from and retractable into said main chassis, said loading tray having first and second compact disk receiving portions onto which the first and second compact disks are loaded, respectively, wherein the first and second compact disks are maintained in said loading tray in parallel and spaced apart planes such that said first and second compact disks at least partially overlap one another, wherein, when said loading tray is retracted into said main chassis, said first and second compact disk receiving portions correspond in position to said first and second compact turntable assemblies, respectively;

first and second compact disk clamps for selectively clamping the first and second compact disks against said first and second compact disk turntable assemblies, respectively;

a pick-up arm assembly comprising:

a pivotable arm coupled to said main chassis at a first end thereof, wherein said pivotable arm sweeps out an area which overlaps at least a portion of each of the first and second compact disks outside of an area in which the first and second compact disks overlap one another; and a linearly moveable pick-up head coupled to said pivotable arm, wherein said pick-up head moves along a line between said first end and a second end of said pivotable arm opposite said first end for reading either said first compact disk or said second compact disk.

2. A compact disk player as claimed in claim 1, further comprising a plurality of compact disk supporting members coupled to said main chassis for selectively supporting the first and second compact disks, wherein at least some of said compact disk supporting members are adapted to supportingly raise the first and second compact disks when said loading tray is extended and to lower the first and second compact disks so as to rest against said respective first and second compact disk turntable assemblies when said loading tray is retracted.

3. A compact disk player as claimed in claim 2, wherein said pivotable arm moves in a plane which is skewed relative to the planes in which the first and second compact disks lie.

4. A compact disk player as claimed in claim 1, wherein said pivotable arm moves in a plane which is skewed relative to the planes in which the first and second compact disks lie.

* * * * *